(12) United States Patent
Martin

(10) Patent No.: US 10,399,672 B2
(45) Date of Patent: Sep. 3, 2019

(54) METHOD FOR FIXING AN ACTUATOR FOR ROTATABLY DRIVING A WHEEL OF AN AIRCRAFT

(71) Applicant: MESSIER-BUGATTI-DOWTY, Velizy Villacoublay (FR)

(72) Inventor: Frederic Martin, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 933 days.

(21) Appl. No.: 14/945,552

(22) Filed: Nov. 19, 2015

(65) Prior Publication Data
US 2016/0152326 A1 Jun. 2, 2016

(30) Foreign Application Priority Data

Nov. 27, 2014 (FR) ..................... 14 61545

(51) Int. Cl.
*B64C 25/34* (2006.01)
*B64C 25/40* (2006.01)
*B64C 25/44* (2006.01)
*F16H 1/10* (2006.01)

(52) U.S. Cl.
CPC ............ *B64C 25/405* (2013.01); *B64C 25/34* (2013.01); *B64C 25/44* (2013.01); *F16H 1/10* (2013.01); *Y02T 50/823* (2013.01)

(58) Field of Classification Search
CPC ........ B64C 25/405; B64C 25/42; B64C 25/44
USPC ......................... 244/50; 301/6.2, 6.5; 74/413; 180/24.07
See application file for complete search history.

(56) References Cited

U.S. PATENT DOCUMENTS

| 2,854,098 A | * | 9/1958 | Griswold ................ F16D 55/46 188/18 A |
| 3,482,806 A | | 12/1969 | Trautzsch et al. |
| 2011/0156472 A1 | | 6/2011 | Bucheton et al. |
| 2011/0304292 A1 | | 12/2011 | Charuel et al. |
| 2013/0327884 A1 | | 12/2013 | Yiu |

FOREIGN PATENT DOCUMENTS

| EP | 2 394 912 A1 | 12/2011 |
| FR | 2 954 752 A1 | 7/2011 |

OTHER PUBLICATIONS

French Preliminary Search Report for FR 1461545 dated Jul. 14, 2015.

* cited by examiner

*Primary Examiner* — William C Joyce
(74) *Attorney, Agent, or Firm* — Sughrue Mion, PLLC

(57) ABSTRACT

A method for fixing to an aircraft landing gear (1) at least one actuator (30) for rotatably driving a wheel (3) which is rotatably mounted on an axle (2) of the landing gear, the wheel being associated with a brake (5). The brake has an actuator carrier (8) which carries brake actuators, the actuator carrier being fitted onto the axle and stopped in terms of rotation by an obstacle (12) which is fixedly joined to the landing gear and which is introduced into one of several stop holes (11) of the actuator carrier. The drive actuator is fixedly joined to the actuator carrier in the region of a stop hole of the actuator carrier which does not receive the obstacle.

6 Claims, 2 Drawing Sheets

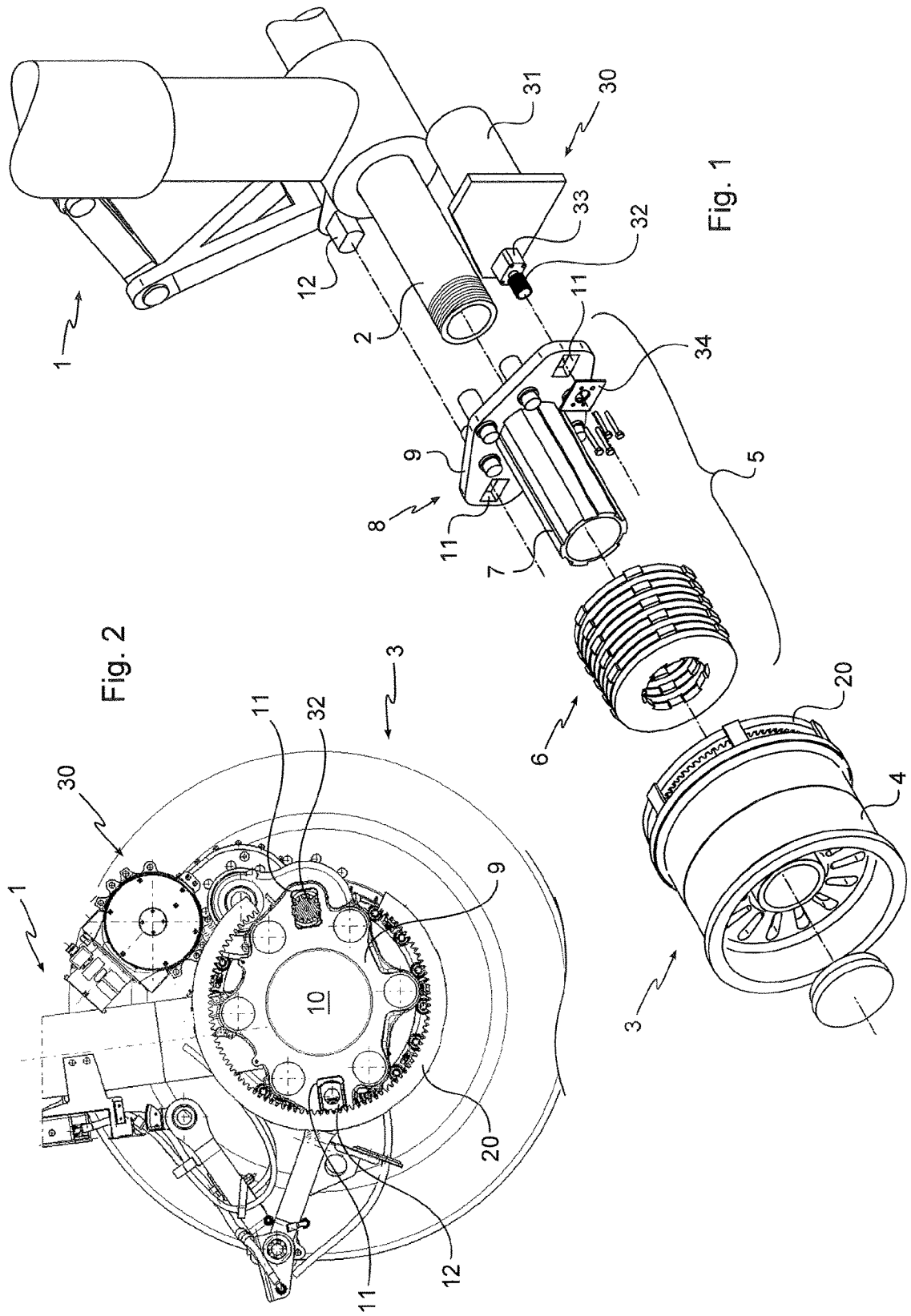

METHOD FOR FIXING AN ACTUATOR FOR ROTATABLY DRIVING A WHEEL OF AN AIRCRAFT

The invention relates to a method for fixing an actuator for rotatably driving a wheel of an aircraft.

TECHNOLOGICAL BACKGROUND OF THE INVENTION

Various methods are known for fixing an actuator for rotatably driving an aircraft wheel to the associated landing gear. For example, document FR2954752 describes the arrangement of an actuator for rotatably driving the wheel which is directly integrated in the actuator carrier of the brake with which the wheel is provided. This arrangement enables a landing gear to be provided with a member for driving its wheels without the landing gear being modified. However, it is necessary to configure new brake actuator carriers which integrate such a drive actuator.

OBJECT OF THE INVENTION

An object of the invention is to provide a method for fixing the drive actuator at the bottom of a landing gear which requires no modification of the brake adjacent to the wheel to be driven.

STATEMENT OF INVENTION

In order to achieve this objective, there is proposed a method for fixing to a landing gear of an aircraft at least one actuator for rotatably driving at least one wheel which is rotatably mounted on an axle of the landing gear, the wheel being associated with a brake which comprises a brake actuator carrier which carries brake actuators, the actuator carrier being fitted onto the axle and stopped in terms of rotation by an obstacle which is fixedly joined to the landing gear and which is introduced into one of the holes of the actuator carrier which serves to stop it in terms of rotation. According to the invention, the drive actuator is fixedly joined to the actuator carrier in the region of a stop hole of the actuator carrier which does not receive the obstacle.

In this manner, the drive actuator is not attached directly to the landing gear, but instead by means of the brake actuator carrier, of which one of the unused stop holes is used. In this manner, neither the landing gear nor the actuator carrier requires structural modifications in order to receive the actuator for rotatably driving the wheel.

According to a specific aspect of the invention, the actuator for rotatably driving the wheel comprises an output shaft which is intended to cooperate with a drive ring of the wheel and which extends through the stop hole of the actuator carrier of the brake when the drive actuator is in position on the actuator carrier of the brake.

According to another specific aspect of the invention, the fixing means comprise a cradle which is fixedly joined to the stop holes of two actuator carriers opposite two wheel brakes which are carried by the same axle, the drive actuator being attached to the cradle.

PRESENTATION OF THE FIGURES

The invention will be better understood in the light of the following description of a specific embodiment of the invention with reference to the Figures of the appended drawings, in which:

FIG. 1 is an exploded schematic view of a landing gear which is provided with a wheel (without the tyre thereof for greater clarity), a brake of the wheel and an actuator for rotatably driving the wheel in accordance with the invention;

FIG. 2 is a partial front view of the landing gear, the wheel, the discs and the axle having been removed, the drive ring of the wheel having been partially sectioned;

DETAILED DESCRIPTION OF AN EMBODIMENT OF THE INVENTION

Figure 3:
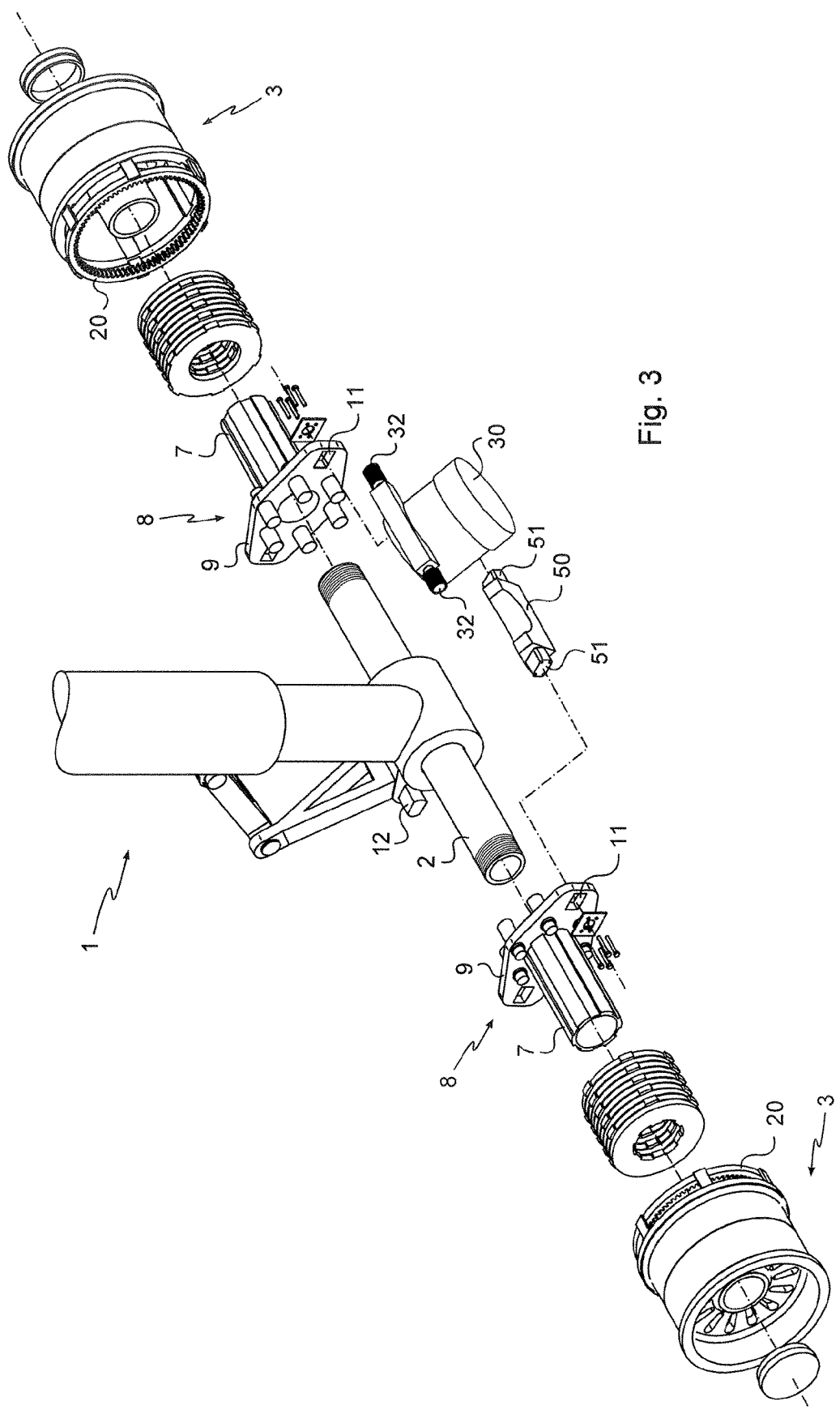
FIG. 3 is an exploded schematic view in accordance with a second embodiment of the invention in which the actuator is arranged on a cradle which extends between two actuator carriers.

According to a first embodiment of the invention illustrated in FIGS. 1 and 2, the invention relates to an aircraft landing gear 1 which carries an axle 2 on which a wheel 3 is mounted so as to rotate. The wheel 3 comprises a rim 4 which carries a tyre and which is associated with a brake 5 which comprises a stack of friction discs 6 which is fitted onto a torsion tube 7 which is connected to an actuator carrier 8 which carries brake actuators (in this instance, hydraulic actuators) which are intended to apply a pressing force to the discs 6. In this instance, the actuator carrier comprises a plate 9 which receives the brake actuators (for example, hydraulic pistons or electromechanical actuators) and which has a circular central hole 10 in order to be able to be fitted onto the axle 2. In order to stop the actuator carrier in terms of rotation, the plate 9 comprises two stop holes 11 (in this instance, having a substantially rectangular cross-section with rounded corners) at one side and the other of the central hole, so that one of the holes faces an obstacle 12 which protrudes from the landing gear in order to be introduced into the opposing stop hole and thus to ensure the stoppage in terms of rotation of the actuator carrier 8. All of this is well known and is set out only by way of illustration.

It should be noted that the actuator carrier 8 is symmetrical is can be used equally well for the right-hand wheel or the left-hand wheel, which explains the presence of two diametrically opposed stop holes 11.

The landing gear is provided with means for driving the wheel in terms of rotation. These means comprise in this instance a drive ring 20 which is fixed to the rim 4 of the wheel 3, and a drive actuator 30, comprising an electric motor 31 (with or without a reduction gear) and whose output shaft is provided with an output pinion 32 which cooperates with the drive ring 20 in order to drive the wheel 3 in rotation.

According to the invention, the drive actuator 30 is in this instance directly fixed to the actuator carrier 8 by means of the stop hole 11 which has remained free. The stop hole which is not used for the stoppage in terms of rotation of the actuator carrier is used in order to fix the actuator 30 for driving in terms of rotation at that location.

More specifically in this instance, the drive actuator 30 comprises a protrusion 33 therefore the cross-section is identical to that of the cross-section of the stop hole 11 in which it is accommodated. The output shaft of the actuator is introduced into this protrusion 33, and therefore through the associated stop hole 11 so that the output pinion 32 opens naturally close to the drive ring 20 of the wheel 3. The output shaft may thus be provided with a bearing as close as possible to the output pinion 32 in order to effectively absorb the transverse forces without excessive flexion of the output shaft.

Any suitable means for immobilising the drive actuator on the actuator carrier may be provided. This may be as in this instance a plate 34 which is attached and screwed at the other side of the protrusion 33 once the actuator is in place in order to fixedly join the actuator to the actuator carrier. This arrangement of the invention enables the use of landing gears and actuator carriers with unchanged mechanical interfaces, so that the drive actuator can be installed in aircraft which are already in service. The non-circular shape of the stop hole further enables a solid fixing which is naturally stopped in terms of rotation.

The drive actuator 30 may be fixedly joined to the actuator carrier 8 before it is mounted on the landing gear. Alternatively, the drive actuator 30 may be disassembled and fixed to the actuator carrier 8 whilst it is already mounted on the landing gear, and even when the wheel 3 is mounted on the landing gear.

According to a second embodiment illustrated in FIG. 3, the drive actuator 30 is attached to a cradle 50 which comprises two ends 51 which are engaged in the free stop holes 11 of the actuator carriers 8 of the wheel brakes 3 which are both carried by the same axle. In this instance, the actuator 30 comprises two output pinions 32 which cannot extend through the stop holes 11 since they are occupied by the ends 51 of the cradle 50. The output pinions extend above the plates 9 of the actuator carriers 8 in order to cooperate with the drive rings 20 of the wheels 3.

The invention is not limited to what has been described above, but instead includes any variant which is included in the scope defined by the claims. In particular, although in the first embodiment the output shaft of the drive actuator extends through the stop hole of the actuator carrier, the output shaft will be able to protrude at the side of the actuator carrier, with the disadvantage of a greater free length. Although in the second embodiment the cradle carries only one drive actuator, it can carry two drive actuators which each cooperate with one of the wheels.

The invention claimed is:

1. A method for fixing to an aircraft landing gear at least one actuator for rotatably driving at least one wheel which is rotatably mounted on an axle of the landing gear, the wheel being associated with a brake which comprises an actuator carrier having a plate which carries brake actuators, and which has two rotation stop holes so that, when the actuator carrier is fitted onto the axle, it is stopped in terms of rotation by an obstacle which is fixedly joined to the landing gear and which is introduced into one of the stop holes of the plate, characterised in that it comprises the steps of attaching and fixing the drive actuator to the actuator carrier by means of the stop hole of the plate which does not receive the obstacle.

2. The fixing method according to claim 1, comprising the step of fixing the drive actuator to the actuator carrier of the brake when said actuator carrier is mounted on the axle of the landing gear.

3. A drive actuator which is specifically adapted to the implementation of the method of claim 1, comprising an output shaft which is provided with an output pinion in order to engage with a drive ring of the wheel, wherein the output shaft opens from a protrusion which is provided for being engaged in the stop hole of the actuator carrier.

4. A method for fixing to an aircraft landing gear at least one actuator for rotatably driving at least one wheel which is rotatably mounted on an axle of the landing gear, the wheel being associated with a brake which comprises an actuator carrier having a plate which carries brake actuators, and which has two rotation stop holes so that, when the actuator carrier is fitted onto the axle, it is stopped in terms of rotation by an obstacle which is fixedly joined to the landing gear and which is introduced into one of the stop holes of the plate, the method comprising the steps of:

attaching and fixing the drive actuator to the actuator carrier by means of the stop hole of the plate which does not receive the obstacle, wherein the drive actuator comprises a protrusion which is provided for being introduced into the stop hole of the actuator carrier, and introducing said protrusion into the stop hole of the actuator carrier.

5. The fixing method according to claim 4, comprising the step of fitting an immobilisation plate at the end of the protrusion, when said protrusion is engaged in the stop hole.

6. A method for fixing to an aircraft landing gear at least one actuator for rotatably driving at least one wheel which is rotatably mounted on an axle of the landing gear, the wheel being associated with a brake which comprises an actuator carrier having a plate which carries brake actuators, and which has two rotation stop holes so that, when the actuator carrier is fitted onto the axle, it is stopped in terms of rotation by an obstacle which is fixedly joined to the landing gear and which is introduced into one of the stop holes of the plate, the method comprising the steps of:

engaging two ends of a cradle in the stop holes of actuator carriers of brakes of wheels which are carried by a same axle, the drive actuator being attached to the cradle.

* * * * *